Feb. 13, 1951 T. S. HUXHAM 2,541,923
MOLDING APPARATUS
Filed Jan. 26, 1946 11 Sheets-Sheet 1

FIG. 1

INVENTOR
T. S. HUXHAM
BY J. MacDonald
ATTORNEY

Feb. 13, 1951 T. S. HUXHAM 2,541,923
MOLDING APPARATUS
Filed Jan. 26, 1946 11 Sheets-Sheet 2

FIG. 2

INVENTOR
T. S. HUXHAM
BY J. MacDonald
ATTORNEY

Feb. 13, 1951 — T. S. HUXHAM — 2,541,923
MOLDING APPARATUS
Filed Jan. 26, 1946 — 11 Sheets-Sheet 5

INVENTOR
T. S. HUXHAM
BY J. MacDonald
ATTORNEY

Feb. 13, 1951     T. S. HUXHAM     2,541,923
MOLDING APPARATUS

Filed Jan. 26, 1946     11 Sheets-Sheet 6

INVENTOR
T. S. HUXHAM
BY J. MacDonald
ATTORNEY

Feb. 13, 1951 T. S. HUXHAM 2,541,923
MOLDING APPARATUS
Filed Jan. 26, 1946 11 Sheets-Sheet 7

INVENTOR
T. S. HUXHAM
BY J. MacDonald
ATTORNEY

Feb. 13, 1951     T. S. HUXHAM     2,541,923
MOLDING APPARATUS
Filed Jan. 26, 1946     11 Sheets-Sheet 8

INVENTOR
T. S. HUXHAM
BY J. MacDonald
ATTORNEY

FIG. 32

Feb. 13, 1951     T. S. HUXHAM     2,541,923
MOLDING APPARATUS
Filed Jan. 26, 1946     11 Sheets-Sheet 10

INVENTOR
T. S. HUXHAM
BY J. MacDonald
ATTORNEY

Feb. 13, 1951 T. S. HUXHAM 2,541,923
MOLDING APPARATUS
Filed Jan. 26, 1946 11 Sheets-Sheet 11

INVENTOR
T. S. HUXHAM
BY J. MacDonald
ATTORNEY

Patented Feb. 13, 1951

2,541,923

UNITED STATES PATENT OFFICE 2,541,923

MOLDING APPARATUS

Trevor S. Huxham, East Orange, N. J., assignor to Bell Telephone Laboratories, Incorporated, New York, N. Y., a corporation of New York Application January 26, 1946, Serial No. 643,733

2 Claims. (Cl. 18—42)

This invention relates to molding apparatus and more particularly to molding apparatus suitable for making body members having spaced walls defining spaces in the body members.

The object of the invention is to provide an improved molding apparatus that is operable to make body members of moldable material and having different numbers and arrangements of spaced walls.

A feature of the invention resides in a mold device employed as a female section or cavity of the mold.

Another feature resides in a core device or male section constructed to enter the mold device.

Another feature resides in a holder for the mold device.

In some potentiometers and rheostats now required card-like resistance elements are supported in a body in which spaced walls are provided to serve as supporting means for the resistance elements and to define spaces in the body to accommodate the resistance elements. The bodies in some cases are made of moldable material and are made in different sizes and with different numbers and arrangements of walls determined by the particular requirements of each case. Male threads are required on the bodies. A mold, and a core device have been required for each size and form of body structure required.

To provide a mold device and a core device for each body structure required is relatively expensive since each mold and core device must be accurately made by skilled artisans, a relatively large amount of material is tied up in the mold and core devices required and considerable storage space must be provided to hold and protect the mold and core devices. Since male threads are provided on the molded bodies it has been found difficult to separate the bodies from the mold without fracturing the bodies.

The present invention provides a molding apparatus in which the mold and core devices are each made of selectively assembled and arranged parts, the selections and arrangements of which are determined in each case by the size of the body required and the number and arrangement of walls required in the body structure. The mold device and the core device are so constructed and arranged that the mold device and the core device may be readily removed from the body after the molding operation.

Figure 2:
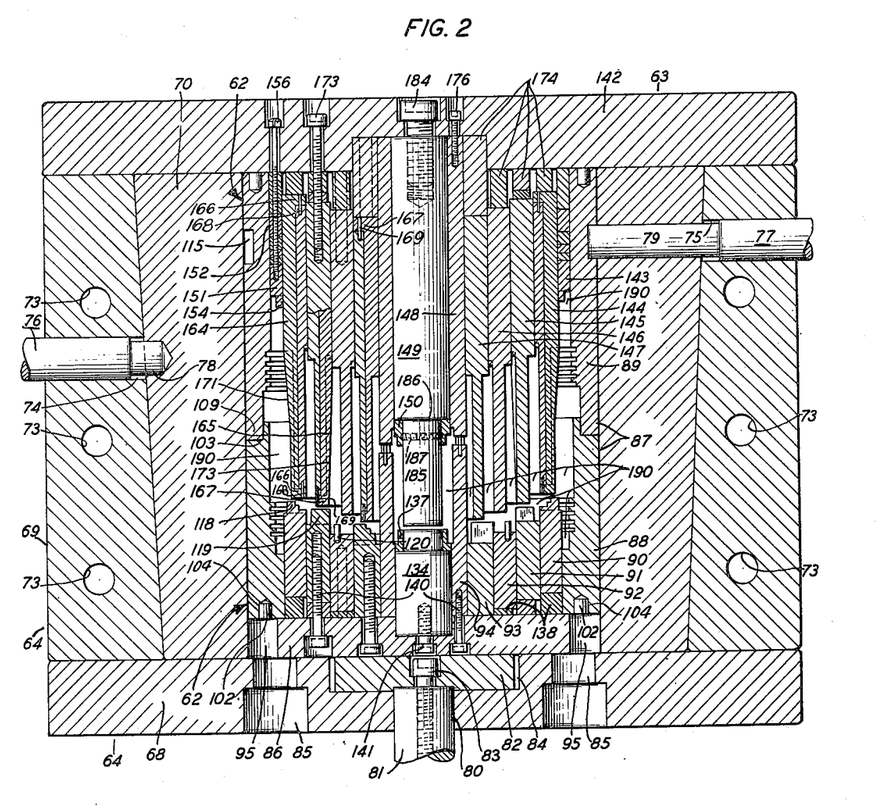
Fig. 2 is an enlarged view, partly in section, of parts of the molding apparatus.
Figure 39:
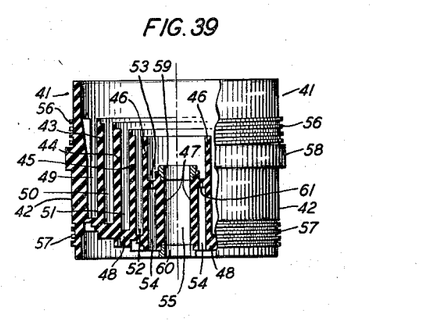
Fig. 39 is a side view, partly in section, of a body made by means of the molding apparatus set-up shown in Fig. 2.

A body of the type shown in Fig. 39 and made of moldable material may be produced by means of the molding apparatus of this invention when the mold device and the core device are constructed and arranged as shown in Fig. 2 and molding material is placed in the mold device and the press is operated to bring the core device into the mold device while the molding material is in plastic condition.

Figure 30:
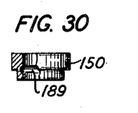
Fig. 30 is a side view, partly in section, of a cone bearing piece to be mounted on the post shown in Fig. 29 for molding into the body member.

The body 41 shown in Fig. 39 comprises an outer annular wall 42 and concentrically arranged and spaced inner walls 43, 44, 45, 46 and 47 and a base wall 48 defining spaces 49, 50, 51, 52, 53, 54 and 55 in the body 41. The outer wall 42 is provided with male threads 56 and 57 one of which may be used to receive an internally threaded cover, not shown, and the other of which may be used to receive a support, not shown, for the body 41. A portion of the outer wall 42 is thickened to provide an outwardly extending flange 58 to form a stop for the cover, not shown. The spaces 49, 50, 51 and 52 provide spaces in which card-like resistance elements, not shown, may be placed and mounted in the body 41. The spaces 53 and 54 provide spaces in which lead wires or terminals, not shown, may extend. The space 55 defined by the wall 47 provides a space through which a shaft, not shown, may extend. Tubular bearings 59 and 60, bearing 59 being the cone bearing piece 150 shown in Fig. 30, are mounted in ends of the wall 47 to receive the shaft, not shown. The wall 46 is connected to the wall 47 by an apertured and stepped horizontal wall 61. Each wall in the set of walls 43 to 46, inclusive, extends upwardly from the base wall 48 and to a different height, the heights progressing downwardly beginning with the wall 43 and ending with the wall 46. The base wall 48 is stepped so that the base wall 48 rises in steps as it progresses from the central region of the body 41 to the outer wall 42. The wall 47 is shorter than any of the other vertical walls in the body 41 and the outer wall 42 extends above and below the upper and lower planes of all other walls in the body 41. Recesses, not shown, are formed in the lower surface of the base wall 48 and in the lower surface of the horizontal wall 61 during the molding operation.

Figure 1:
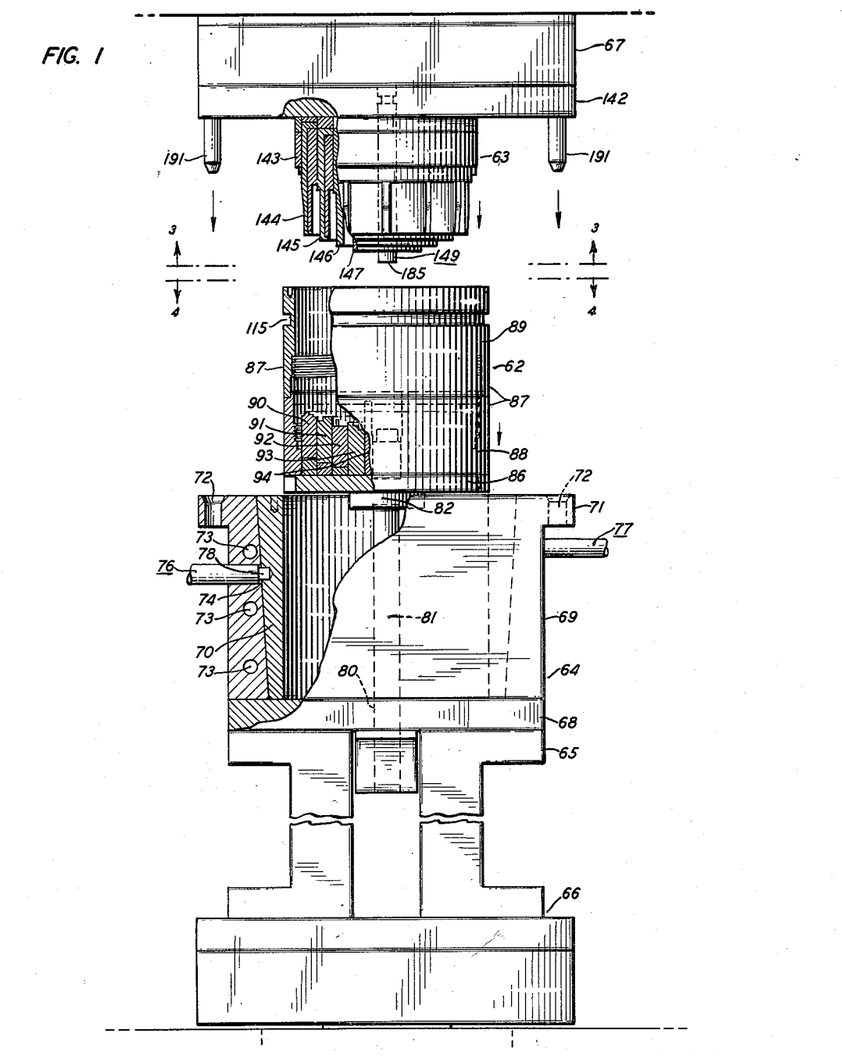
Fig. 1 is a front view, partly in section, of the molding apparatus of this invention mounted in a press.

The body 41 shown in Fig. 39 may be readily made by means of the present invention when the mold device 62 and the core device 63 are constructed and arranged as shown in Figs. 1 and 2. The mold device 62 is constructed to fit into and be supported by a mold holder 64 supported on a lower platen 65 supported in a press 66. The core device 63 is carried by an upper platen 67 of the press 66 and the press 66 is operable to move the platens 65 and 67 toward and away from each other.

The mold holder 64 is constructed to receive the mold device 62 and comprises an apertured base 68, a flanged tubular member 69 supported on and extending upwardly from the base 68 and a removable tubular filler piece 70 resting on the base 68 and extending upwardly in the tubular member 69. The bore of the tubular member 69 is tapered to accommodate the filler piece 70, the outer wall surface of which is tapered to match the bore of the tubular member 69, the filler piece 70 being insertable through the top of the tubular member 69. The flange 71 on the upper end of the tubular member 69 is apertured at spaced points 72 for a purpose to be later explained. Spaced passageways 73 are provided in the tubular member 69 through which steam or other heating means may enter the wall of the tubular member 69 to heat the mold holder 64. Laterally extending apertures 74 and 75 are formed in the tubular member 69 to receive removable holding rods 76 and 77, respectively. The holding rod 76 is constructed to extend through the aperture 74 in the tubular member 69 and into a cavity 78 formed in the filler piece 70 and serves to prevent undue withdrawal of the filler piece 70 from the tubular member 69. The holding rod 77 is constructed to extend through the aperture 75 in the tubular member 69 and through a corresponding aperture 79 formed in the filler piece 70 and into engagement with the mold device 62 and serves to prevent undue withdrawal of the mold device 62 from the filler piece 70. The base 68 of the mold holder 64 is apertured at 80 to accommodate a plunger 81 on the upper end of which is supported an ejector plate 82 secured by suitable fastening means 83 to the plunger 81. The ejector plate 82 normally rests in a recess 84 formed in the upper surface of the base 68 but may be thrust upwardly therefrom by suitable operation of the plunger 81. Spaced slots 85 are provided in the base 68 to permit an ejecting tool, not shown, to be inserted through the base 68 into engagement with the mold device 62.

Figure 8:
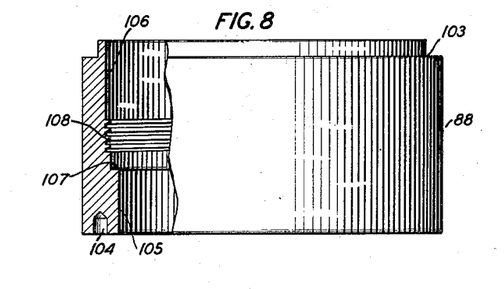
Fig. 8 is a side view, partly in section, of a lower portion of the outer wall of the mold device.
Figure 9:
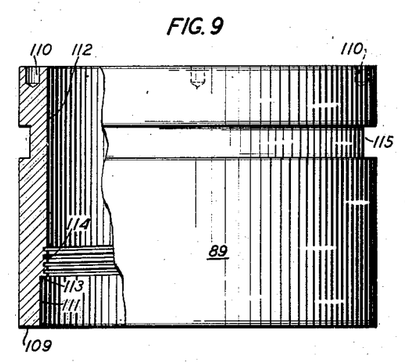
Fig. 9 is a side view, partly in section, of an upper portion of the outer wall of the mold device.
Figure 10:
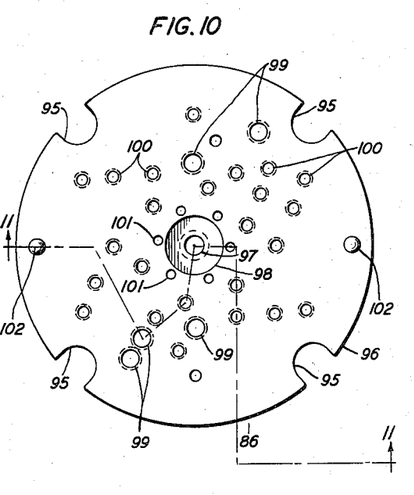
Fig. 10 is a top plan view of the base of the mold device.
Figure 11:
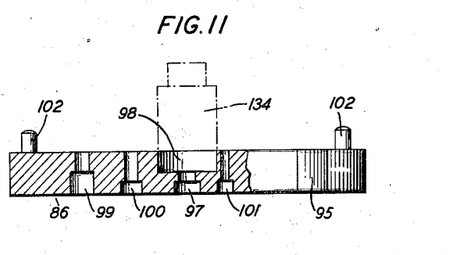
Fig. 11 is a side view, partly in section, of the base shown in Fig. 10.

The mold device 62 comprises an apertured base plate 86 shown in Figs. 10 and 11, a two-part outer wall 87 comprising a lower outer wall member 88 shown in Fig. 8 and an upper outer wall member 89 shown in Fig. 9 and concentric walls 90, 91, 92, 93 and 94 which are telescopically arranged within the area defined by the lower outer wall member 88. The walls 90, 91, 92, 93 and 94 are annular in form and extend upwardly, and each to a different height, in the space defined by the lower outer wall member 88.

The base plate 86 as shown in Fig. 10 is circular in form with spaced notches 95 formed in the peripheral edge 96. A central aperture 97 is provided in the base plate 86 and opens into a circular indentation 98 formed in the upper surface of the base plate 86. Spaced counterbored apertures 99, 100 and 101 are provided in the base plate 86 to accommodate bolts by means of which the walls 90 to 94 are mounted on the base plate 86. Studs 102 are mounted on the base plate 86 and project upwardly from the upper surface thereof to hold the lower outer wall member 88 against lateral movement on the base plate 86.

The two-part outer wall 87 is cooperatively formed by the lower outer wall member 88 and the upper outer wall member 89, the upper outer wall member 89 being placed on and in end-to-end relation with the lower outer wall member 88. The lower outer wall member 88 is shown in Fig. 8 and has an upper shouldered end portion 103 and a lower end portion in which spaced cavities 104 are provided to receive the studs 102 on the base plate 86. The inner portion of the lower outer wall member 88 is of two different diameters to provide a lower cylindrical inner surface 105 and a larger upper cylindrical inner surface 106 joined by a shoulder 107. The upper cylindrical inner surface 106 is internally threaded to provide screw threads 108. The upper outer wall member 89 is shown in Fig. 9 and has a lower end portion 109 to fit the upper shouldered end portion 103 of the lower outer wall member 88. The upper end portion of the upper outer wall member 89 is provided with spaced cavities 110 for a purpose to be later explained. The inner portion of the upper outer wall member 89 is of different diameters to provide a lower cylindrical inner surface 111 and an upper cylindrical inner surface 112 of smaller diameter, the lower and upper cylindrical surfaces 111 and 112 being joined by a shoulder 113. The upper cylindrical inner surface 112 is internally threaded to provide the screw threads 114. A groove 115 is formed in the outer surface of the upper outer wall member 89 to accommodate the holding rod 77 in the mold holder 64.

Figures 12, 19, 20, 21:
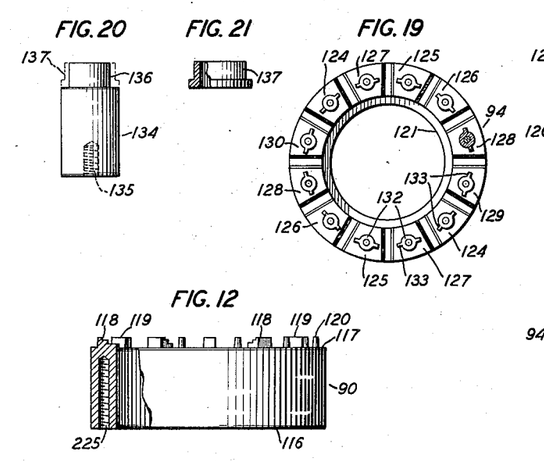
Fig. 12 is a side view, partly in section, of a wall constructed for use as an annular wall in the mold device.
Fig. 19 is a top view of the member shown in Fig. 18.
Fig. 20 is a side elevational view of a cylindrical post employed as the lower inner wall in the mold device.
Fig. 21 is a side view, partly in section, of a bearing piece constructed to fit on the post shown in Fig. 20 and intended to be molded into the body member.
Figure 14:
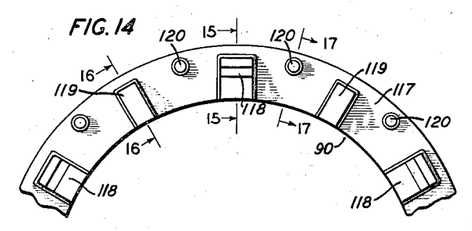
Fig. 14 is an enlarged top view of a portion of the annular wall shown in Fig. 12.
Figure 15:
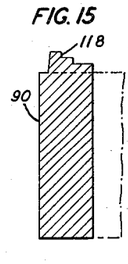
Fig. 15 is a vertical cross-section of a portion of the annular wall shown in Fig. 12 and taken on the line 15—15 in Fig. 14.
Figure 16:
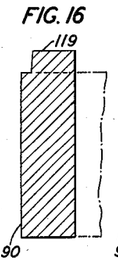
Fig. 16 is a vertical cross-section of a portion of the annular wall shown in Fig. 12 and taken on the line 16—16 in Fig. 14.
Figure 17:
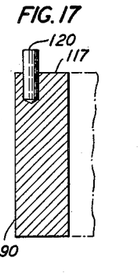
Fig. 17 is a vertical cross-section of a portion of the annular wall shown in Fig. 12 and taken on the line 17—17 in Fig. 14.

The walls 90 to 93, inclusive, are alike in structure but are different in dimensions and an illustration and description of the wall 90 will be sufficient for an understanding of the structure of each wall 90 to 93. The wall 90 is shown in Fig. 12 and is of ring-line form with internally threaded bolt receiving holes 225 extending upwardly from the lower end 116. The upper end 117 of the wall 90 is formed to provide spaced embossings 118 and 119 and spaced pins 120 are mounted in the upper end 117, the arrangement of the embossings 118 and 119 and the pins 120 being as shown in the enlarged view shown in Fig. 14, various cross-sections of portions of the wall 90 being shown in Figs. 15 to 17, inclusive.

Figure 18:
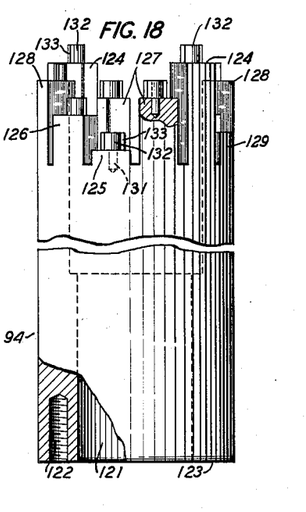
Fig. 18 is an enlarged side elevation, partly in section, of a tubular member employed as an inner annular wall in the mold device.

The wall 94 is of smaller diameter than the walls 90 to 93, inclusive, and as shown in Figs. 18 and 19 is a tubular member with a longitudinal bore 121 of two different diameters. Internally threaded bolt receiving holes 122 are formed in the lower end portion 123. The upper end portion 124 of the wall 94 is made castle-like in form to provide spaced and longitudinally extending tower-like projections 125, 126, 127, 128, 129 and 130. Mounted by means of pins 131 on the tower-like projections 125 to 130 are cylindrical blocks 132 with radially extending wing portions 133. The smaller diameter portion of the bore 121 is dimensioned to accommodate a cylindrical post 134 shown in Fig. 20, the lower end of the post 134 having an internally threaded bolt receiving hole 135 formed therein and the upper end of the post 134 being reduced in diameter as shown at 136 to form a rest for a flanged bearing piece 137 shown in Figs. 20 and 21.

Figure 13:
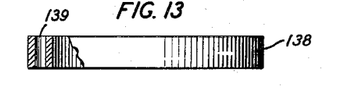
Fig. 13 is a side view, partly in section, of a spacer ring to adjust the position of the annular wall shown in Fig. 12.

The parts of the mold device 62 are assembled as shown in Fig. 2, the walls 90 to 94, inclusive, being telescopically arranged and extending upright relative to the base plate 86. The walls 90 to 92, inclusive, are each elevated from the base plate 86 to a different height from the others by means of a ring 138 constructed as shown in Fig. 13. The ring 138 is provided with spaced apertures 139 to register with the bolt receiving holes 225 provided in the wall under which the ring 138 is disposed. The ring 138 in each case is of suitable diameter to match the diameter of the wall under which it is disposed and each ring 138 is of different thickness from the others. The walls 90 to 94, inclusive, are held in position by means of bolts 140 which extend upwardly through apertures in the base plate 86 and into the bolt receiving holes in the walls. When a ring 138 is provided under a wall the bolts 140 extend through the apertures 139 in the ring 138 and into the bolt receiving holes 225 in the wall in register with the ring 138.

The post 134 extends upwardly in the space defined by the wall 94 and is mounted on the base plate 86 by means of the bolt 141, the lower end of the post 134 being disposed in the circular indentation 98 in the baseplate 86 and so that the bolt 141 is received in the bolt receiving hole 135 in the lower end of the post 134. The flanged bearing piece 137 is removably mounted on the upper end portion of the post 134.

The lower outer wall member 88 of the two-part outer wall 87 is removably mounted on the base plate 86 and so that the studs 102 in the base plate 86 extend into the cavities 104 in the lower outer wall member 88. The upper outer wall member 89 of the two-part outer wall 87 is removably mounted on the upper end of the lower outer wall member 88 and so that the lower end portion 109 of the upper outer wall member 89 rests on the upper shouldered end portion 103 of the lower outer wall member 88.

It will be seen as shown in Fig. 2 that the walls 90 to 94, inclusive, of the mold device 62 are telescoped one within another and about the post 134 and that the walls 90 to 94, inclusive, and the post 134 extend upwardly in the space defined by the lower outer wall member 88 of the two-part outer wall 87. It will also be seen as shown in Fig. 2 that the two-part outer wall 87 is encompassed by and bears against the inner surface of the filler piece 70 of the mold holder 64. The mold device 62 is normally held against upward longitudinal movement in the filler piece 70 of the mold holder 64 by means of the holding rod 77, the inner end of which extends into the groove 115 in the upper outer wall member 89 of the two-part outer wall 87. When the holding rod 77 is withdrawn from the groove 115 the mold device 62 may be moved upwardly in the filler piece 70 and out of the mold holder 64 as shown in Fig. 1 by suitable operation of the plunger 81, the filler piece 70 being normally held against upward movement in the tubular member 69 by means of the holding rod 76 in the mold holder 64.

Figure 5:
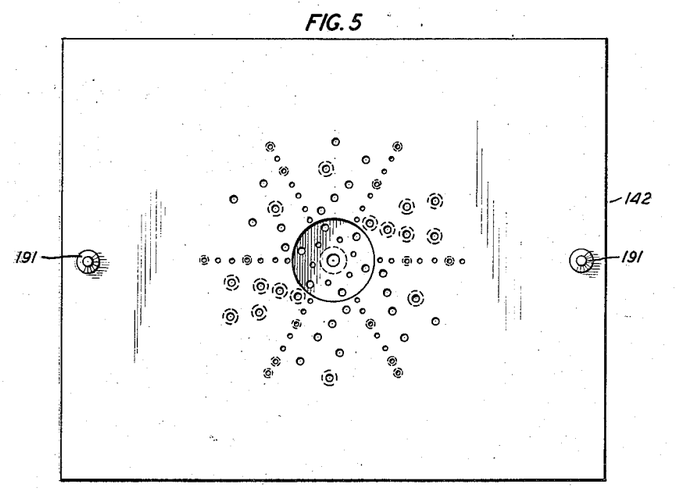
Fig. 5 is a bottom plan view of a top plate of the core device.
Figure 6:
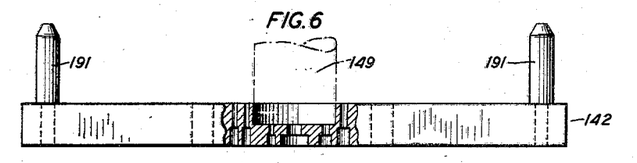
Fig. 6 is a side view, partly in section, of the top plate shown in Fig. 5 and inverted relative to its normal position.
Figure 7:
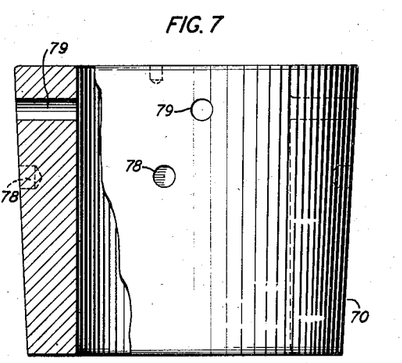
Fig. 7 is a side elevation, partly in section, of a filler piece employed in the holder of the mold device.

The core device 63 shown in Figs. 1 and 2 comprises an apertured top plate 142 shown in Figs. 5 and 6 and concentrically arranged walls 143, 144, 145, 146, 147 and 148, a post 149, and a removable bearing piece 150, the walls and the post being mounted on the top plate 142 and extending downwardly thereof and the bearing piece 150 being removably mounted on the post 149.

Figure 22:
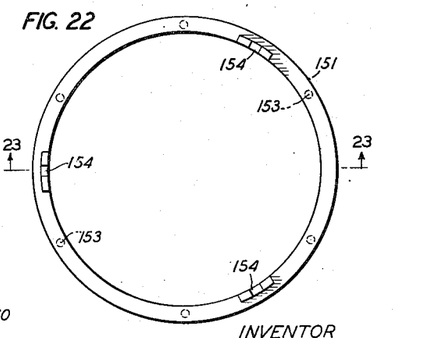
Fig. 22 is a bottom plan view of a ring constructed to form part of an outer wall of the core device.
Figure 23:
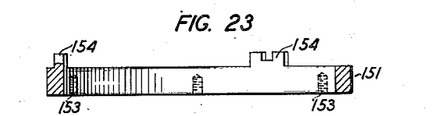
Fig. 23 is a view of cross-section of the ring shown in Fig. 22, inverted relative to its normal position and taken on the line 23—23 in Fig. 22.
Figure 24:
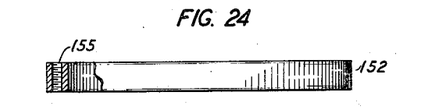
Fig. 24 is a side elevation, partly in section, of a spacer ring to be used in adjusting the position of the ring shown in Figs. 22 and 23.

The wall 143 is annular in form and is dimensioned to fit in the space defined by the upper outer wall member 89 of the two-part outer wall 87 of the mold device 62 and bear against the inner surface of the upper outer wall member 89. The wall 143 extends downwardly from the top plate 142 a shorter distance than any of the other walls of the core device 63 and is constructed of a plurality of parts shown in Figs. 22, 23 and 24, the lowenmost part being an annular member 151, shown in Figs. 22 and 23 and the other parts of the wall 143 being made up of one or more annular members 152 constructed as shown in Fig. 24 and designed to be placed in register with the annular member 151. Spaced bolt receiving holes 153 are formed in one end of the annular member 151 and the other end is provided with spaced notched projections 154. The annular member 152 is provided with spaced bolt accommodating holes 155 to register with the bolt receiving holes 153 in the annular member 151. The annular member 151 is inverted from the position shown in Fig. 23 and is mounted together with several of the annular members 152 on the top plate 142 by means of bolts 156 and so that the spaced notched projections 154 extend downwardly and form the lowermost points on the wall 143 cooperatively formed by the annular member 151 and the annular members 152.

Figure 25:
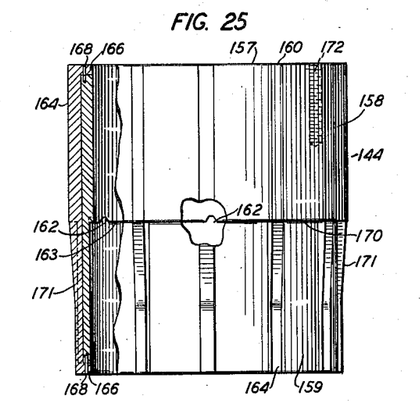
Fig. 25 is a side view, partly in section, of an annular wall employed in the core device.
Figure 26:
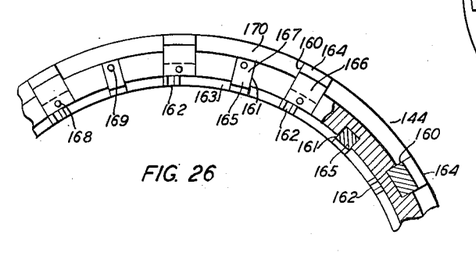
Fig. 26 is an enlarged bottom plan view, partly in section, of a portion of the annular wall shown in Fig. 25.

The walls 144 to 147, inclusive, are each constructed as shown in Fig. 25 but are of different diameters. An understanding of the construction of the wall 144, however, will be sufficient for an understanding of the construction of the walls 144 to 147, inclusive. The wall 144 shown in Fig. 25 comprises a tubular body 157 having an upper portion 158 and a lower portion 159, the upper portion 158 being of larger outside diameter and smaller inside diameter than the lower portion 159. Spaced longitudinally extending slots 160 and 161 are formed in the outer and inner surfaces respectively of the body 157 and spaced notches 162 are formed in the inner shoulder 163. Mounted in the slots 160 and 161 are bars 164 and 165, respectively, which are thicker than the depths of the slots in which they are disposed and so that portions of the bars 164 extend outwardly of the body 157 and portions of the bars 165 extend into the space defined by the body 157. Ends of the body 157 are space-notched to accommodate lugs 166 and 167 formed respectively on ends of the bars 164 and 165 and the bars 164 and 165 are secured in place in the body 157 by means of pins 168 and 169 which extend through the lugs 166 and 167, respectively, and into the body 157. The arrangements of the bars 164 and 165 are illustrated in the enlarged view in Fig. 26. Each bar 164 is of tapered form and has an upper portion of uniform thickness extending from the upper portion of the body 157 to the outer shoulder 170 on the body 157. From the point where the bar 164 emerges from the shoulder 170 the bar 164 gradually decreases in thickness for a distance slightly more than half-way down the lower portion 159 of the body 157 and then is of uniform thickness to the point where the lower end of the bar 164 terminates in the lug 166. The outer surface of the bar 164, therefore, forms an inclined plane portion 171 extending from a point below the shoulder 170 on the body 157 to a point slightly more than half-way down the lower portion 159 of the body 157. Spaced and internally threaded bolt receiving holes 172 are provided in the upper end of the upper portion 158 of the body 157 to permit mounting the wall 144 on the top plate 142 by means of bolts 173. Each bar 165 is of tapered form and has an upper portion of uniform thickness extending in the upper portion of the slot 161 and to the inner shoulder 163, the bar 165 then gradually decreases in thickness to the point where the bar 165 extends to the lower end of the body 157 and terminates in the lug 167 formed on the lower end of the bar 165 and which is secured to the body 157 by means of the pin 169. The bar 165, therefore, presents an inclined plane portion 173, shown in Fig. 2, extending into the space defined by the lower portion 159 of the body 157.

The walls 144 to 147, inclusive, are telescopically arranged and disposed inwardly of the wall 143. Annular members 174 of different thicknesses and diameters but constructed like the annular member 152 shown in Fig. 24 are placed in register with the walls 144 to 147 and between the walls 144 to 147 and the lower surface of the top plate 142 to make the walls 144 to 147 extend each a greater distance from the top plate 142 than the preceding wall in the core device 63.

Figure 27:
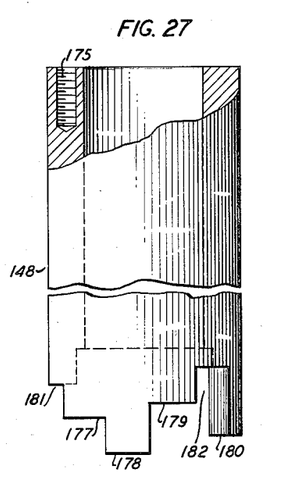
Fig. 27 is a side view, partly in section, of a wall employed in the core device.
Figure 28:
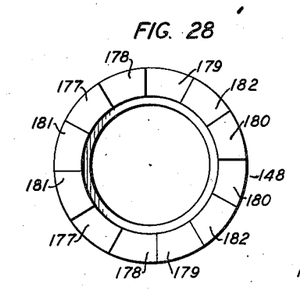
Fig. 28 is a bottom plan view of the wall shown in Fig. 27.

The wall 148 is of tubular form as shown in enlarged view in Fig. 27 and is provided with spaced bolt receiving holes 175 to receive bolts 176 by means of which the wall 148 is mounted on the top plate 142 as shown in Fig. 2. The lower end of the wall 148 is formed to provide block-like projections 177, 178, 179 and 180 and spaces 181 and 182 to register with the tower-like projections 126 to 130 provided on the wall 94 of the mold device 62.

Figure 29:
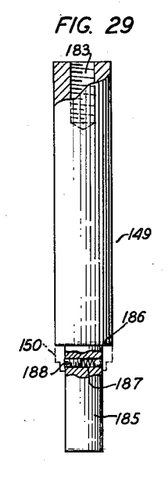
Fig. 29 is a side view, partly in section, of a post used as the innermost wall in the core device.

The post 149 shown in Fig. 29 is constructed to extend longitudinally in the space defined by the wall 148 and is longer than the wall 148. The upper end of the post 149 is provided with a bolt receiving hole 183 to receive a bolt 184 by means of which the post 149 is mounted on the top plate 142. The post 149 is positioned to register with the post 134 in the mold device 62 and the lower portion 185 is reduced in diameter to form a shoulder 186 and so that the lower portion 185 will extend into and be in spaced relation with the inner surface of the wall 94 in the mold device 62 when the mold device 62 and the core device 63 are brought into cooperative condition for molding moldable material to a required form. Below the shoulder 186 the post 149 is transversely drilled to accommodate a spring 187 and a trapped ball 188 which is operable to enter a groove 189 in the bearing piece 150 which is removably mounted on the post 149 and pressed up against the shoulder 186.

As shown in Fig. 1 the mold device 62, the core device 63 and the mold holder 64 are constructed for mounting in a press 66, the mold holder 64 is supported on a lower platen 65, the base plate 86 of the mold device 62 is supported on a plunger 81 and in position to descend into the mold holder 64 and the core device 63 is in position to descend into the mold device 62. It will be understood that the plunger 81 may be operated to let the mold device 62 descend into the mold holder 64 and that the press 66 may be operated to bring the core device 63 into the mold device 62.

In Fig. 2 the mold device 62 has been lowered into the mold holder 64 and the core device 63 has been moved downwardly into the mold device 62. It will be seen in Fig. 2 that the core device 63 is in the space defined by the outer wall 87 of the mold device 62, the walls 144 to 148, inclusive, of the core device 63 are in register with and are slightly elevated from the corresponding walls 90 to 94, inclusive, of the mold device 62, the post 134 of the mold device 62 is in register with the post 149 of the core device 63 and the posts 134 and 149 are equipped with the removable bearing pieces 137 and 150, respectively. It is to be observed that the mold device 62 and the core device 63 when brought to the positions shown in Fig. 2 cooperatively define a space 190 into which moldable material may flow when the moldable material is disposed between the mold device 62 and the core device 63 and the moldable material is in condition to flow and the core device 63 is brought to the position shown in Fig. 2 while the moldable material is in required moldable condition. It may also be seen in Fig. 2 that the space 190 is of required pattern to make the moldable material take the shape of the finished body 41 shown in Fig. 39 and in which the walls 42 to 48, inclusive, the wall 61, the threads 56 and 57 and the flange 58 have been formed in the molding of the body by virtue of the form of the space 190 cooperatively defined by the mold device 62 and the core device 63. The body 41 has bearings 59 and 60 of suitable material supported in ends of the wall 47. These bearings 59 and 60 are molded into the body 41 when the wall 47 is being formed during the molding operation and are the bearing pieces 137 and 150 which were formerly in the mold device 62 and the core device 63, respectively.

Figure 4:
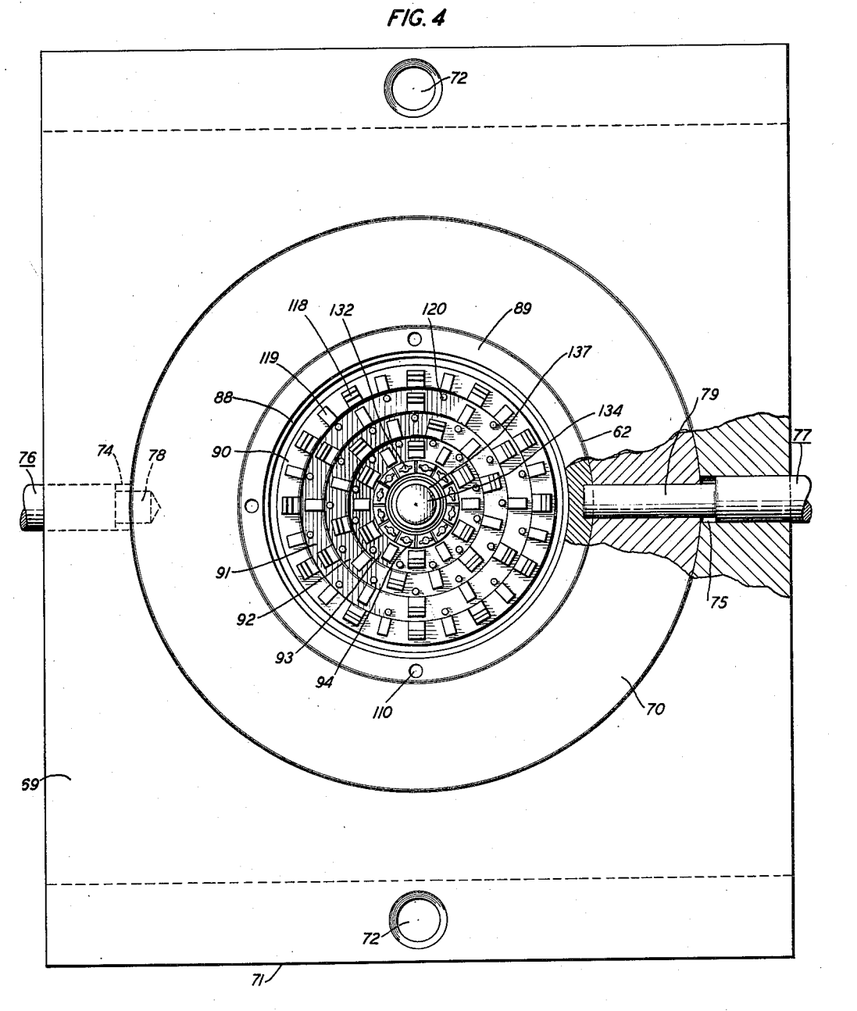
Fig. 4 is a top plan view, partly in section, of the mold device and the holder for the mold device.

When a body 41 of the type shown in Fig. 39 is to be made by means of the molding apparatus of the present invention the mold device 62 and the core device 63 required are constructed by assembling and mounting the required walls and post of the mold device 62 on the base plate 86 and by assembling and mounting the required walls and post of the core device 63 on the top plate 142. The mold holder 64 is made to present a suitable receptacle for the mold device 62 by selecting and placing in the mold holder 64 the required filler piece 70, the internal diameter of which is correct for receiving the two parts 88 and 89 of the two-part outer wall 87 of the mold device 62. The filler piece 70 of the mold holder 64 is held against undesired removal from the tubular member 69 of the mold holder 64 by means of the removable holding rod 76, the inner end of which extends into the cavity 78 in the filler piece 70. The removable bearing piece 137 is placed in required position on the post 134 of the mold device 62, the mold device 62 is placed on the ejector plate 82 and the mold device 62 is lowered into the mold holder 64, the holding rod 79 being withdrawn from the path of movement of the mold device 62 until the mold device 62 is moved to its required position in the mold holder 64. After the mold device 62 is in required position in the mold holder 64 the holding rod 79 is thrust inwardly of the mold holder 64 to bring the inner end of the holding rod 79 into the groove 115 in the upper outer wall member 89 of the two-part outer wall 87 of the mold device 62 to hold the mold device 62 against undesired upward movement in the mold holder 64. When the mold device 62 is in required position in the mold holder 64 and the mold device 62 and mold holder 64 are viewed from the top the parts are in the positions shown in Fig. 4.

Figure 3:
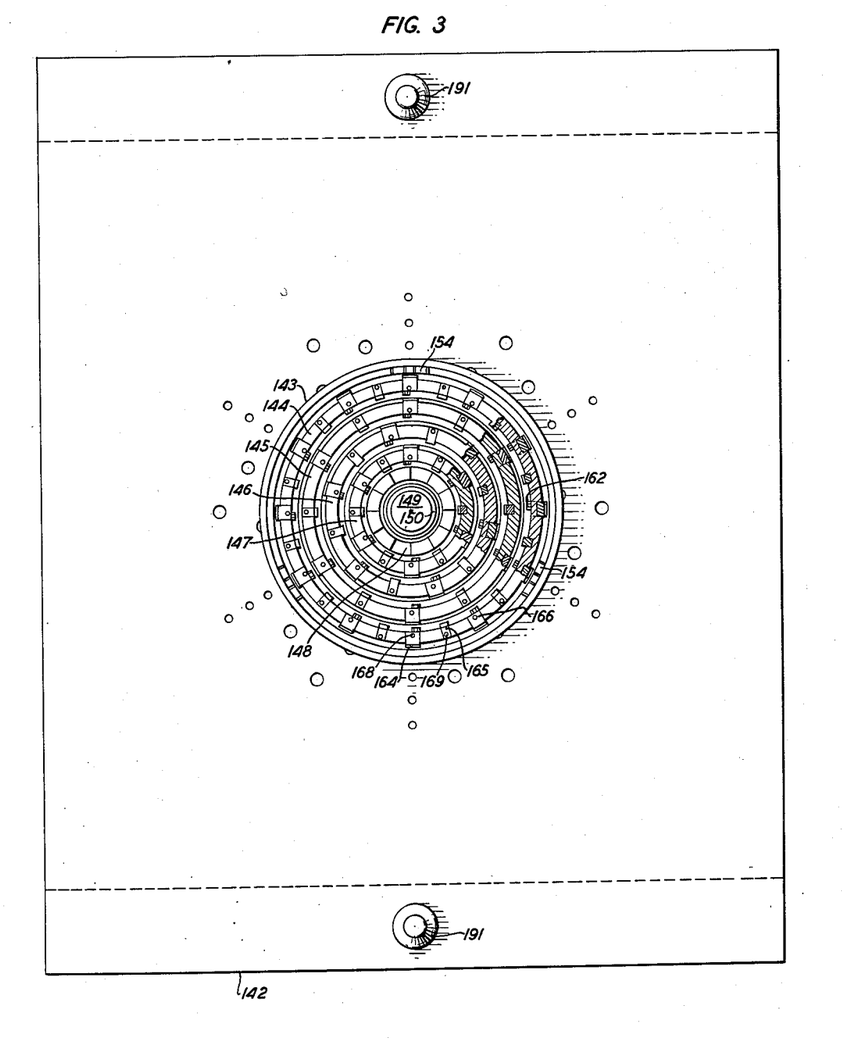
Fig. 3 is a bottom plan view, partly in section, of the core device.

When the core device 63 has been constructed by assembling and mounting the required walls and post on the top plate 142 and bearing piece 150 is removably mounted on the post 149 by placing the bearing piece 150 on the lower end of the post 149 and thrusting the bearing piece 150 along the post until the trapped ball 188 snaps into the groove 189 and the bearing piece is against the shoulder 186 on the post 149. When the core device 63 has been constructed by assembling and mounting the required parts on the top plate 142 the core device 63 is secured by suitable means to the upper platen 67 of the press 66 and in position to enter the mold device 62 when the press 66 is operated to bring the platens 65 and 67 relatively near each other. The platens 65 and 67 may be heated in any suitable manner to transmit heat to the mold device 62 and the core device 63 or the mold device 62 and the core device 63 may be heated in any other suitable manner, for instance, by way of the mold holder 64. The top plate 142 of the core device 63 is provided with guide pins 191 to enter the apertures 72 in the flange 71 of the tubular member 69 of the mold holder 64 to guide the core device 63 into the mold device 62. A bottom plan view of the core device 63 is shown in Fig. 3 in which the parts may be seen in their relative positions.

The body 41 may be made of any moldable material found suitable for making body with the molding apparatus of this invention. Since the molding apparatus is constructed so that it may be readily heated, the choice of materials may extend even to thermoplastic or thermosetting materials. It will be assumed, however, merely for the purpose of simplifying the specification and not in the sense of a limitation of the invention that the material chosen is a material that may be reduced to a moldable condition while in the molding apparatus and that parts of the molding apparatus are brought to the required elevated temperature or temperatures during the molding operation.

The moldable material to be molded to required form to make the body 41 may be a preform of moldable material of predetermined size and form placed in the mold device 62 or some measured amount of some other form of moldable material may be placed in the mold device 62. When the core device 63 is moved downwardly into the mold device 62 to the required extent and the moldable material is reduced to a plastic condition the moldable material will move into the space 190 and take the shape of the body 41. After the material has set, the press 66 may be operated to lift the core device 63 out of the mold device 62 and the body 41 and considerably above the mold device 62. The holding rod 77 in the mold holder 64 may be then withdrawn from the groove 115 in the upper outer wall member 89 of the mold device 62 and the plunger 81 may be operated to move the mold device 62 upwardly and out of the mold holder 64 to the position shown in Fig. 1.

As already pointed out the body 41 has male threads on its outer surface and the outer wall 87 of the mold device 62 is made in two parts. The two-part wall 87 structure and arrangement facilitates removal of the body 41 from the mold device 62 and reduces the hazard of fracturing the body 41 during the removal operation.

Figure 31:
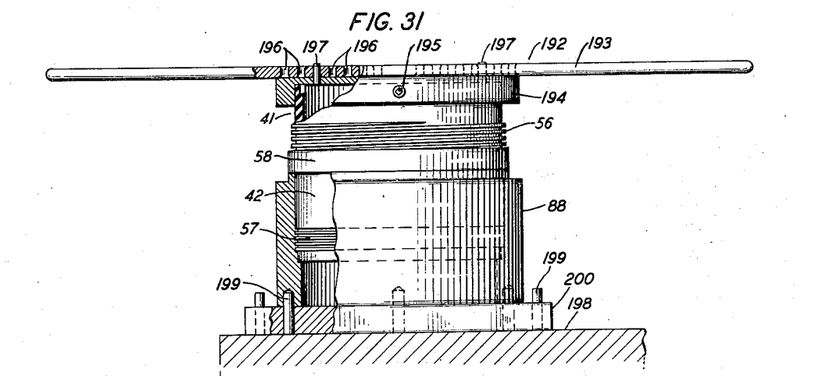
Fig. 31 shows the molded body still within parts of the mold device, a wrench applied to the body to facilitate removal of the body from parts of the mold device and part of the mold device supported on a work table.

To get the body 41 out of the mold device 62 a wrench of suitable form and such, for instance, as the wrench 192 shown in Fig. 31 may be employed. The wrench 192 comprises a handle 193 and an inverted cup-like casing 194 provided with set screws 195. The handle 193 has spaced apertures 196 formed therein in which pins 197 may be selectively set to engage in apertures provided in the casing 194 or to engage in the spaced cavities 110 provided in the upper outer wall member 89 of the two-part wall 87 of the mold device 62. By applying the wrench to the mold device 62 and with the pins 197 of the wrench in the cavities 110 the upper outer wall member 89 of the two-part wall 87 of the mold device 62 may be unscrewed from the body 41 and removed therefrom and from the lower outer wall member 88 of the two-part wall 87 of the mold device 62. The body 41 with the lower outer wall member 88 of the two-part wall 87 of the mold device 62 may be lifted from the remaining parts of the mold device 62 and placed on a table 198 having pins 199 extending upwardly from a platform 200 on which the lower outer wall 88 may rest, the pins 199 being positioned to extend into the cavities 104 in the lower outer wall member 88. The wrench 192 may be set to grip the body 41 and operated to unscrew the body 41 from the lower outer wall member 88 of the two-part wall 87 of the mold device 62.

The molding apparatus of this invention is not limited to the making of one size body since various parts of the mold device 62, the core device 63 and the mold holder 64 are removably supported on and in their respective supports and some of the parts are replaceable by like parts but of different diameters. The number and arrangement of the concentric walls provided in the mold device 62 and in the core device 63 depend on the number of walls required in the body to be made and the inside diameter of the outer wall 87 of the mold device, and the inside diameter of the filler piece 70 depends on the outside diameter of the body to be made.

Figure 32:
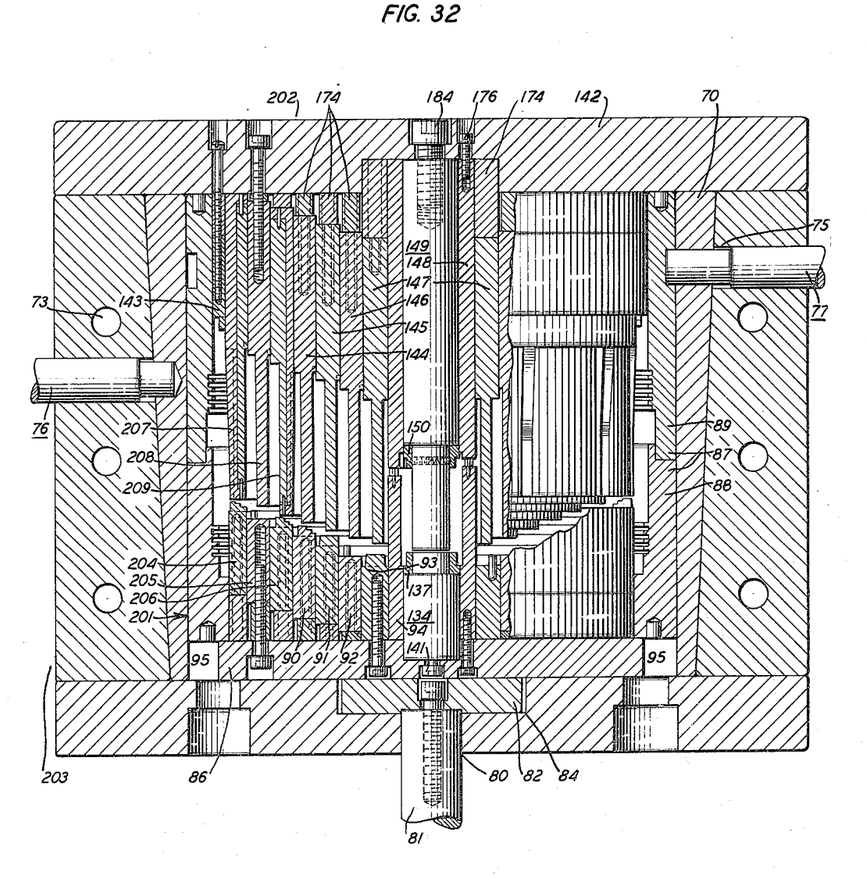
Fig. 32 is an enlarged view, partly in section, of parts of the molding apparatus with the mold device and core device assembled and operable to produce a body of the type shown in Fig. 39 but somewhat larger and having more wall members and more spaces than in the body produced by means of the mold device and core device set up in Fig. 2.

In Fig. 32 the mold device 201, the core device 202 and the mold holder 203 correspond respectively to the device 62, the core device 63 and the mold holder 64 previously described but are set up and arranged to make a body of larger diameter and having a greater number of walls than the body made by means of the molding apparatus shown in Fig. 2. Parts shown in Fig. 32 which are exactly the same as corresponding parts shown in Fig. 2 and parts shown in Fig. 32 which are the same in structure as corresponding parts shown in Fig. 2 but are different only in dimensions are identified in Fig. 32 by the same numbers as in Fig. 2.

The mold device 201 shown in Fig. 32 performs the same function as the mold device 62 shown in Fig. 2 and the main difference in the mold device 201 and the mold device 62 lies in the fact that three more walls are provided in the mold device 201 than in the mold device 62. The three additional walls are identified as 204, 205 and 206. The walls 204, 205 and 206 follow the structure of the wall 90 illustrated in Figs. 12, 14, 15, 16 and 17 and previously described. The mold device 201 has been constructed by selecting and suitably mounting the required walls on a base plate 86 of required dimensions.

The core device 202 shown in Fig. 32 performs the same function as the core device 63 shown in Fig. 2 and the main difference in the core device 202 and the core device 63 lies in the fact that three more walls are provided in the core device 202 than in the core device 63. The three additional walls are identified in Fig. 32 as 207, 208 and 209. The walls 207, 208 and 209 follow the structure of the wall 144 shown in Figs. 25 and 26 and previously described. The core device 202 has been constructed by selecting and suitably mounting the required walls on the top plate 142.

The mold holder 203 shown in Fig. 32 performs the same function as the mold holder 64 shown in Fig. 2 and the main difference in the mold holder 203 and the mold holder 64 lies in the fact that the fillerpiece 70 in the mold holder 203 has a larger inside diameter than the filler piece 70 in the mold holder 64.

The pattern and structure of the body produced by means of the molding apparatus shown in Fig. 32 may be visualized by observing the open spaces left between the mold device 201 and the core device 202 and with the understanding that the molding material placed in the mold device 201 flows into these open spaces when the moldable material is softened and the molding apparatus is suitably operated.

Figure 33:
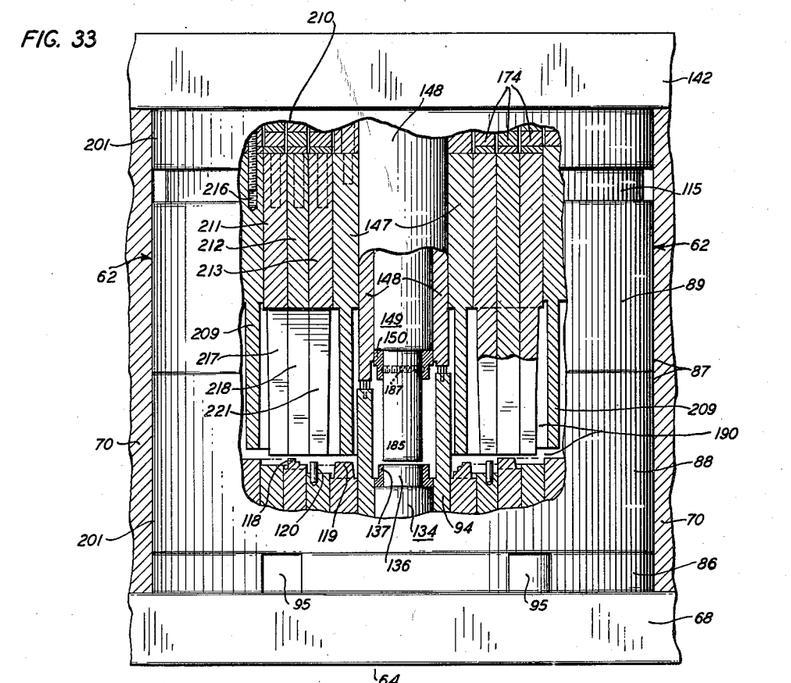
Fig. 33 is a side elevation view, partly in section, of parts of the apparatus shown in Fig. 2 but with certain parts of the mold device and core device shown in Fig. 2 removed and some of the removed parts replaced by some additional parts to make the mold device and core device operable to produce a body of the general type shown in Fig. 39 but having a smaller number of walls and spaces provided therein and having connecting spokes formed in the molded body.
Figure 34:
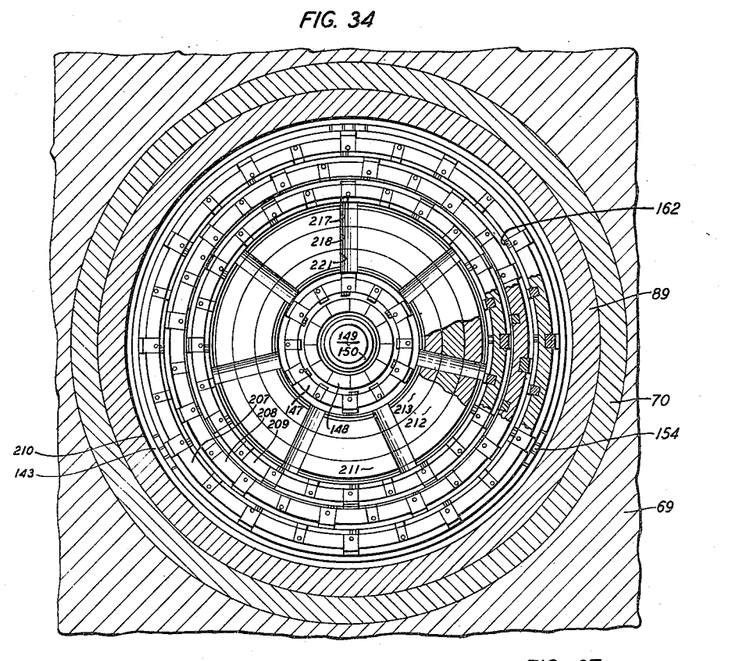
Fig. 34 is a bottom plan view of the core device employed in the set-up and arrangement shown in Fig. 33.

In some cases a body may be required of the same diameter as the body produced by means of the molding apparatus shown in Fig. 32 but minus some of the walls present in that body and having spokes formed in the body where the walls are left out. In Figs. 33 and 34 the molding apparatus is constructed to produce a body of the general structure produceable by means of the molding apparatus shown in Fig. 32 but with a smaller number of walls and with spokes in portions of the body.

In Figs. 33 and 34 the molding apparatus comprises the mold device 201 and the mold holder 203 both of which are employed in Fig. 32 and a core device 210 constructed to enter the mold device 201. The core device 210 follows in general the structure of the core device 202 shown in Fig. 32 but is minus the walls 144, 145 and 146 present in the core device 202.

Figure 35:
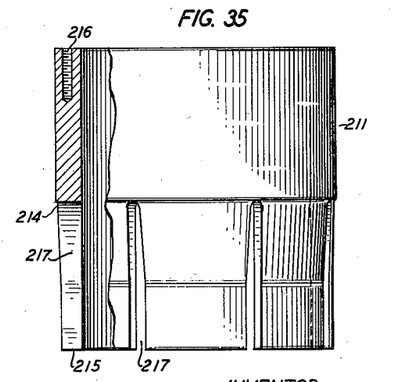
Figs. 35, 36 and 37 are enlarged side views, partly in section, of some of the parts used in the core device set-up and arrangement shown in Fig. 33.

In the core device 210 walls 211, 212 and 213 are concentrically arranged and supported on the top plate 142 and take the places of the respective walls 144, 145 and 146 present in the core device 202. The walls 211, 212 and 213 are tubular in form and when nested together with the wall 211 disposed outside and the wall 213 disposed inside the wall 212 fill the space occupied by the walls 144, 145 and 146 in the core device 202. The wall 211 as shown in Fig. 35 is reduced in outside diameter in its lower portion to form a shoulder 214, the reduction gradually increasing downward from the shoulder 214 part way to the lower end 215 and then being uniform to the lower end 215. The bore of the wall 211 is uniform throughout the structure. The upper end of the wall 211 is provided with spaced bolt receiving holes 216 to receive bolts 173 by means of which the wall is mounted on the top plate 142. Spaced openings 217 extending longitudinally from the lower end 215 of the wall 211 to the shoulder 214 are formed in the wall 211.

Figure 36:
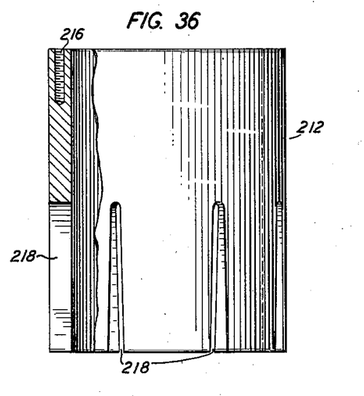

The wall 212 shown in Fig. 36 follows the structure of the wall 211 with the exception that the wall 212 has no shoulder 214 and is not reduced in diameter at any point. The spaced openings 218 formed in the lower portion of the wall 212 are arranged to register with the spaced openings 217 in the wall 211 when the wall 212 is properly placed within the wall 211.

Figure 37:
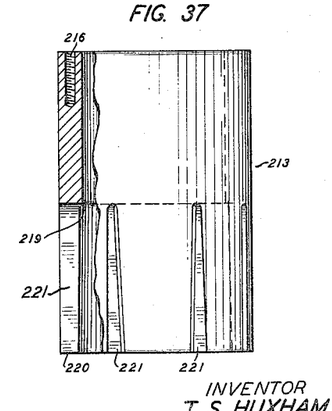
Figure 38:
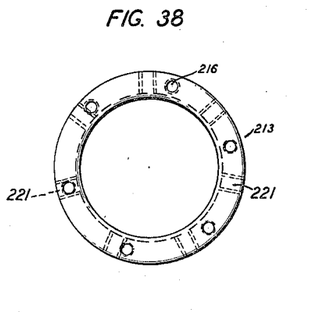
Fig. 38 is a top plan view of the wall part shown in Fig. 37.

The wall 213 shown in Fig. 37 follows in general the structure of the wall 212 but the bore is enlarged in the lower portion to form an internal shoulder 219, the bore gradually enlarging from the shoulder 219 to the lower end 220 of the wall 213. The spaced openings 221 formed in the lower portion of the wall 213 extend longitudinally upward from the lower end 220 to the shoulder 219 and are arranged to register with the spaced openings 218 in the wall 212 when the wall 213 is properly placed within the wall 212.

When moldable material is placed in the mold device 201 and the core device 210 is moved downwardly in the mold device 201 while the moldable material is in a softened condition some of the moldable material flows into the spaces 217, 218 and 221 formed in the walls 211, 212 and 213 and forms strengthening spokes in the body produced, the spokes being joined to other portions of the body and serving to strengthen portions of the body.

The present invention provides a molding apparatus that may be used to make molded bodies of various sizes and forms and in which spaces must be provided to accommodate card-like electrical elements. The mold device and the core device which are capable of being used in cooperation to form a mold to shape moldable material to the required body form are each provided with walls removably mounted on plates. A required mold and core device may be made up by selectively mounting the walls on the plates, the selection and arrangement of the walls being determined by the size and form of the body required to be made by means of the molding apparatus. Embossings and projecting parts on the walls of the mold device and the core device will result in the production of corresponding recesses and indentations in the walls of the molded body produced by means of the molding apparatus.

What is claimed is:

1. A molding apparatus comprising a cup-like mold, a side wall in said cup-like mold consisting of two separable annular wall members arranged in end-to-end abutting relation, a screw thread pattern formed in the inner surface of each of said annular wall members to form male threads on an article molded in the molding apparatus and end portions on said annular wall members having spaced cavities formed therein to facilitate rotating said annular wall members, relative to an article molded in said cup-like mold, to unscrew said annular wall members from said article.

2. A molding apparatus comprising a mold device and a core device operable to enter said mold device, concentric walls in said mold device extending to different heights, concentric walls in said core device extending to different depths and arranged to extend into longitudinal register and spaced relation with the corresponding concentric walls in said mold device, the corresponding walls in said mold device and in said core device being cooperable to define a space of stepped form in said molding apparatus, the walls in said core device being also arranged to define concentric spaces in the molding apparatus, tower-like projections formed on an end of one of the concentric walls in said mold device, block-like projections formed on an end of one of the concentric walls in said core device and in register with said tower-like projections and blocks with radially extending wing portions mounted on said tower-like projections and in register with said block-like projections.

TREVOR S. HUXHAM.

REFERENCES CITED

The following references are of record in the file of this patent:

UNITED STATES PATENTS

| Number | Name | Date |
|---|---|---|
| 34,344 | Baldwin | Feb. 11, 1862 |
| 469,053 | Beatty | Feb. 16, 1892 |
| 1,150,437 | Layman | Aug. 17, 1915 |
| 1,244,676 | Wilcox | Oct. 30, 1917 |
| 1,898,251 | Kopp | Feb. 21, 1933 |
| 1,919,070 | McKay et al. | July 18, 1933 |
| 2,100,985 | Smally | Nov. 30, 1937 |
| 2,194,538 | Allen | Mar. 26, 1940 |
| 2,321,469 | Draving | June 8, 1943 |
| 2,325,687 | Kux | Aug. 3, 1943 |
| 2,327,665 | Peat | Aug. 24, 1943 |
| 2,350,971 | Pecker et al. | June 6, 1944 |
| 2,380,659 | McDougal | July 31, 1945 |